Oct. 7, 1969 A. J. PRESTI 3,471,700

LINEAR SIGNAL GAIN CONTROLLED NETWORKS

Filed Nov. 1, 1966

INVENTOR
A. J. PRESTI
BY C. E. Hirsch Jr.
ATTORNEY

United States Patent Office 3,471,700

Patented Oct. 7, 1969

3,471,700

LINEAR SIGNAL GAIN CONTROLLED NETWORKS

Anthony J. Presti, Warren Township, Somerset County, N.J., assignor to Bell Telephone Laboratories, Incorporated, Murray Hill and Berkeley Heights, N.J., a corporation of New York Filed Nov. 1, 1966, Ser. No. 591,221
Int. Cl. H01j *39/12*
U.S. Cl. 250—206 3 Claims

ABSTRACT OF THE DISCLOSURE

The linearity of a signal circuit, which employs a photoresistive device under the influence of applied illumination to control its gain, is improved by an equalizing signal applied to the circuit by way of a feedback network. The equalizing signal is supplied to the input of the signal circuit, passed through the photoresistive element, and together with applied gain control signals, utilized to adjust the intensity of the light applied to the photoresistive device.

This invention relates to signal multiplier networks and, more particularly, to wide range linear multipliers that have closely controlled signal input-output characteristics.

Signal multipliers are frequently required to implement an electronic circuit function, and a wide range of circuits and devices are available. For example, a simple potentiometer may be thought of as a two-quadrant multiplier in which the output signal is the product of the input signal and the shaft angle magnitude. A typical four-quadrant multiplier may include a phase splitter and variable summing elements to control the phase and gain of an applied signal in accordance with an applied control signal. A variety of variable impedance elements, such as field-effect transistors, may be used to sum the positive and negative phase signals.

Although such devices are satisfactory for most applications, they often are unable to accommodate wide-range signals, and often distort applied signals. Many circuits cannot tolerate such distortion or nonlinear action.

It is therefore an object of this invention to supply the need for highly linear, low distortion, signal multipliers.

A low distortion, linear, gain-controlled circuit, such as a multiplier circuit, in accordance with this invention, employs a photoresistive device to control the gain characteristic of the circuit. A photoresistive device typically includes a source of illumination and a photoelectric responsive element packaged together in a light tight enclosure. The impedance of the photoelectric element is a function of lamp intensity. Since the lamp may be controlled by an applied signal, a circuit which includes the photoelectric element may be made to vary as a function of the control signal applied to the lamp circuit. Unfortunately, the input-output characteristic of such a variable gain circuit is extremely nonlinear. The photoresistive element cannot therefore be used directly for exacting circuit requirements.

In accordance with this invention, the linearity of a circuit employing a photoresistive device is controlled by a feedback network. As a result, the device may be used as a two- or as a four-quadrant multiplier which exhibits a high degree of linearity and stability and low signal distortion.

The invention will be fully apprehended from the following detailed description of illustrative embodiments thereof taken in connection with the appended drawings in which.

Figure 1:
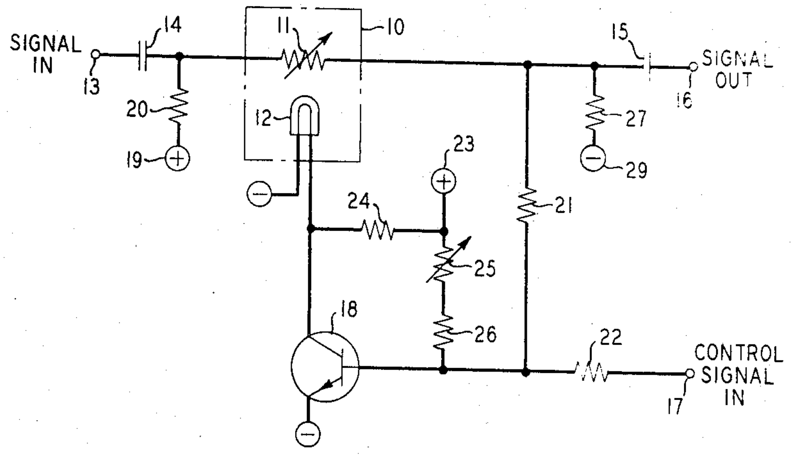
FIG.1 is a diagram of a two-quadrant multiplier constructed in accordance with the present invention.

The two-quadrant signal multiplier illustrated in FIG. 1 employs a photoresistive device 10 which includes a photoresistive element 11 and a source of illumination 12 enclosed in a light-tight enclosure. As the intensity of lamp 12 is varied, so also the resistance of element 11 varies. Different light sources and different photocells with a wide range of operating characteristics are available. The photoresistive elements are generally poly-crystalline semiconductors of materials such as cadmium sulfide, cadmium selenite or lead telluride, usually selected for speed of operation, resistivity, power handling capacity, and the like. The light source may be either an incandescent filament lamp or ionized gas. The ionized gas light source has much lower thermal inertia than the incandescent filament and thus has a faster response time. The filamentary-type, on the other hand, operates at much lower control voltages and thus is better suited for use with transistor circuits. One commercially available photoresistive device that has been found entirely satisfactory in practice is marketed under the name "Raytheon Raysistor." For example, Raytheon Model CK–1114 has a control voltage rating of about zero to one volt and a current range from about zero to seventeen milliamperes.

Thus, in operation, a signal applied to terminal 13 is directed by way of isolation capacitor 14 through variable resistance element 11 and by way of isolation capacitor 15 to an output terminal 16. Control signals supplied to terminal 17 are applied, by way of an amplifier including transistor 18, to lamp 12. Thus, signals applied to terminal 13 are adjusted in level in accordance with control signal magnitudes before reaching output terminal 16.

Since control of resistance element 11 is a nonlinear function of applied control signals at terminal 17, and further depends on the photocell load impedance, extremely nonlinear operation is achieved with the circuit described so far. In accordance with the invention, feedback is employed to assure that the output signal developed at terminal 16 is linearly related to the control signal applied to terminal 17. The feedback path includes a DC potential applied at terminal 19 and supplied by way of resistor 20 to the input of photoresistive device 10. Feedback occurs through resistive element 11 and resistor 21 connected between the output of photoresistive element 10 and the input of transistor amplifier 18. Control current input to element 18 is the difference between the input current and the feedback current. The input current is approximately equal to control voltage at terminal 17 divided by the resistance of element 22, while feedback current is approximately equal to the DC output of control element 10 divided by the resistance of feedback resistor 21. This feedback system has been found to be extremely effective in linearizing the resistance versus control voltage characteristic of photoresistive element 10.

The DC voltage component fed to the photoelectric element is supplied to the current control amplifier in negative phase to the DC control voltage. That is, a positive control voltage produces a positive signal phase output and a negative DC voltage to be fed back, and a negative control voltage produces a negative signal phase and a positive DC voltage to be fed back. The circuit is balanced so that a control voltage of zero produces zero signal at the output and zero DC voltage at the output. When an AC signal is applied to input terminal 13, the net DC feedback signal is unaffected. Since the DC output voltage is forced to follow the DC control, the AC signal output at terminal 16 will automatically be proportional to the control signal applied at terminal 17.

Thus, voltage source 19 and resistor 20 provide DC biasing at the input to element 10 and resistor 21 provides negative feedback around element 10 to linearize the signal input-output charactristic. Transistor amplifier 18 may be biased appropriately from positive source 23 operating through resistors 25 and 26, as desired. Resistor 24 limits the maximum lamp current which can flow through element 12.

Figure 2:
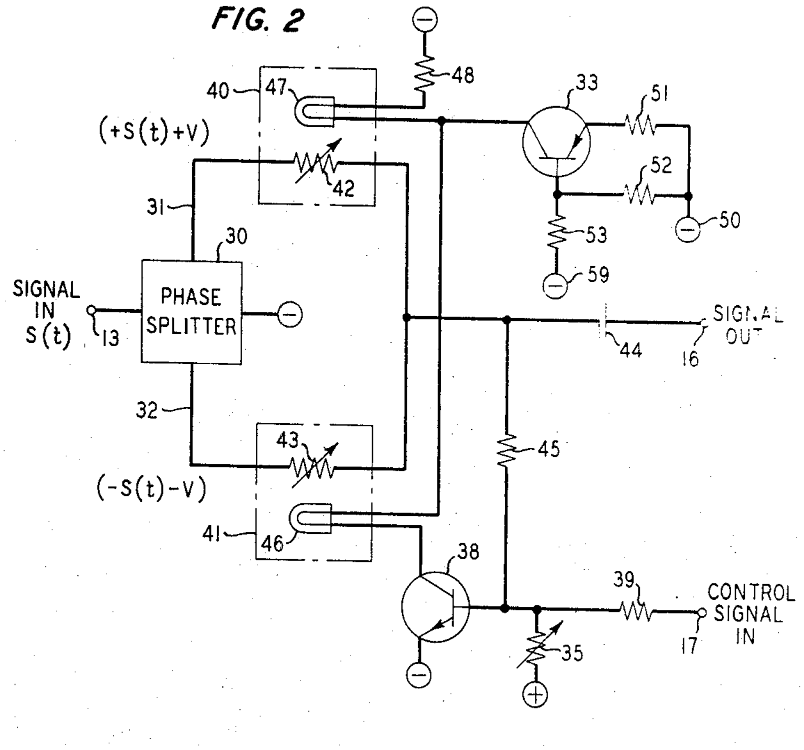
FIG. 2 is a diagram showing a four-quadrant multiplier constructed in accordance with the principles of the invention.
Figure 3:
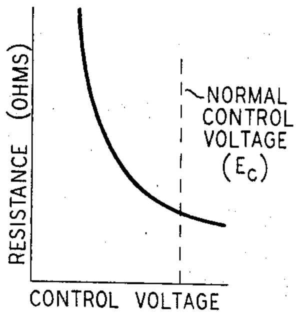
FIG. 3 is a graph illustrating the signal resistance of a typical photoresistive device as a function of applied control voltage.

A four-quadrant multiplier network in accordance with the invention is illustrated in FIG. 2. An input signal applied to terminal 13 is supplied to phase splitter 30 which produces at its outputs replicas of the input signal with a voltage gain of +1 and −1, respectively. Phase splitter 30 also supplies a fixed DC voltage to each output channel, a plus voltage being applied to the signal in circuit 31 and a negative fixed voltage, of effual magnitude, being applied to the signals in circuit 32. Numerous other techniques may be employed to apply the fixed DC voltages to the output circuits of phase splitter 30. The DC voltages are fed back to a control amplifier including transistor 38 to assure a linear relation of the control input (at terminal 17) versus output (at terminal 16) characteristic. In effect, transistor 38 acts as a variable current generator controlled by a current $I_b$ developed in the base circuit of the transistor in response to the difference between control current through resistor 39 and feedback current through resistor 45. It may be desirable to provide some signal integration at the input to transistor 38 to prevent overloading by the AC signal in the feedback path.

Input signals supplied by way of phase splitter 30 to circuits 31 and 32 are supplied, respectively, to photoresistive devices 40 and 41. Signals reaching device 40 are passed through variable resistance element 42 and those signals reaching device 41 are passed through variable resistance element 43. The adjusted signals are combined and supplied by way of isolation capacitor 44 to output terminal 16. The DC signals, which accompany the applied signals, are summed and passed by way of resistor 45 to the input of transistor amplifier 38 to control the ampulifier and aid in linearizing the control input versus output characteristic of elements 40 and 41. If feedback resistor 45 and input resistor 39 are approximately equal in value, it has been found that extremely good linearity may be obtained. For example, in a typical circuit it has been possible to maintain linearity within 1 db over a 55 db range for either positive or negative DC control. The measured harmonic distortion in the signal path was measured as well below 0.5 percent.

A constant current generator including, for example, transistor 33 biased from source 50 by way of resistors 51, 52 and 53, is used to deliver current to the lamps. In practice, a current of approximately 20 milliamperes has been found to aid in assuring linear operation, assuming the use of commercially available photoresistive devices. The manner in which the constant current from generator 33 is shared between the two lamps, 47 associated with photoresistive device 40 and 46 associated with photoresistive device 41, depends on the controlled current through element 38.

Because of the extreme linearity and low distortion characteristic of the feedback multipliers described by way of the example above, such circuits may be used advantageously in a variety by circuit applications. For example, adaptive echo cancellers, for example, of the type described by J. L. Kelly, Jr. and B. F. Logan, Ser. No. 591,382 filed Oct. 31, 1966, employ a plurality of multipliers at the several output terminals of a delay line system. The linear operation of the multipliers constructed in accordance with this invention are ideally suited to this application.

The above-described arrangements are of course merely illustrative of the application of the principles of the invention. Numerous other arrangements may be devised by those skilled in the art without, however, departing from the spirit and scope of the invention.

What is claimed is:

1. A signal controlled circuit which comprises,
a controlled gain signal channel for directing applied signals through photoresistive means to an output terminal,
means for directing an auxiliary signal through said photoresistive means to said output terminal,
an intensity controlled light source for controlling the resistance of said photoresistive means,
adjustable means for controlling the intensity of said light source, and
means differentially responsive to said auxiliary signal supplied through said photoresistive means and to externally developed control signals for selectively adjusting said intensity controlling means.

2. A signal control circuit which comprises,
means for developing positive and negative phase signals in response to applied signals,
means for adding a positive DC signal to said positive phase signal to produce a first sum signal,
means for adding a negative DC signal to said negative phase signal to produce a second sum signal,
a first controlled gain signal channel for directing said first sum signal through photoresistive means,
a second controlled gain channel for directing said second sum signal through photoresistive means,
means for combining said first and said second sum signals,
intenisty controlled light means for controlling the resistance of said photoresistive means in said first and in said second signal channels,
adjustable means for controlling the intensity of said light sources, and
means differentially responsive to said DC signals supplied through said photoresistive means and to externally developed control signals for selectively adjusting said intensity controlling means.

3. A gain control circuit which comprises,
a signal channel including a photoelectric resistance element,
means for directing alternating current signals through said channel,
means for selectively passing a direct current through said photoelectric resistance element,
a lamp for illuminating said photoresistance element,
controlled means for adjusting the flow of direct current through said lamp,
means for applying an externally developed control signal and a selected portion of the direct current passed through said photoelectric resistance element to said controlled means for adjusting said flow of current through said lamp.

References Cited

UNITED STATES PATENTS

| | | | |
|---|---|---|---|
| 3,082,381 | 3/1963 | Morrill | 330—59 |
| 3,202,926 | 8/1965 | Ford | 330—59 |
| 3,331,012 | 7/1967 | Aiken | 323—21 |

JAMES W. LAWRENCE, Primary Examiner

E. R. LAROCHE, Assistant Examiner

U.S. Cl. X.R.

250—205; 315—158; 323—21; 330—59